United States Patent
Chong et al.

(10) Patent No.: US 10,798,427 B2
(45) Date of Patent: Oct. 6, 2020

(54) SYSTEM AND METHOD FOR PROVIDING FAILOVER OF STORAGE FOR DIGITAL CINEMA BROADCASTING

(71) Applicant: GDC Technology (Shenzhen) Limited, Shenzhen (CN)

(72) Inventors: Man Nang Chong, North Point (HK); Pranay Kumar, North Point (HK); Chern Yue Kwok, North Point (HK); Jing Zheng Tan, North Point (HK); Jian Xing Huang, North Point (HK)

(73) Assignee: GDC TECHNOLOGY (SHENZHEN) LIMITED, Shenzhen (CN)

( * ) Notice: Subject to any disclaimer, the term of this patent is extended or adjusted under 35 U.S.C. 154(b) by 0 days.

(21) Appl. No.: 15/953,315

(22) Filed: Apr. 13, 2018

(65) Prior Publication Data

US 2019/0124372 A1 Apr. 25, 2019

(30) Foreign Application Priority Data

Oct. 19, 2017 (CN) .......................... 2017 1 0997976

(51) Int. Cl.
*H04N 7/173* (2011.01)
*H04N 21/231* (2011.01)
*H04N 21/24* (2011.01)
*H04N 21/435* (2011.01)
*H04N 21/262* (2011.01)

(52) U.S. Cl.
CPC ....... *H04N 21/231* (2013.01); *H04N 21/2404* (2013.01); *H04N 21/26258* (2013.01); *H04N 21/435* (2013.01)

(58) Field of Classification Search
None
See application file for complete search history.

(56) References Cited

U.S. PATENT DOCUMENTS

| 8,281,344 | B1* | 10/2012 | Mathias | H04N 21/41415 709/203 |
| 8,893,192 | B1* | 11/2014 | Bates | H04N 21/2143 386/200 |
| 2002/0095679 | A1* | 7/2002 | Bonini | H04N 21/4126 725/74 |
| 2004/0100437 | A1* | 5/2004 | Hunter | H04N 21/8153 345/102 |
| 2004/0181807 | A1* | 9/2004 | Theiste | H04N 21/41415 725/82 |
| 2005/0076372 | A1* | 4/2005 | Moore | H04N 7/165 725/78 |

(Continued)

*Primary Examiner* — William J Kim
(74) *Attorney, Agent, or Firm* — Morrison & Foerster, LLP

(57) ABSTRACT

The present invention relates to a system and method for providing a failover of storage for media content, including media content used for broadcasting in cinema. One embodiment of the invention stores copies of digital cinema packages ("DCPs") to both a central storage facility as well as a local storage facility. When a server module reading DCPs in central storage module encounters abnormalities, it switches reading operations to the local storage module, at the same frame location from which interruption occurred. The present invention provides a multi-layered storage system for cinema broadcasting of a movie to decrease likelihood of interruptions during a broadcast that may be caused by failure of the central storage facility.

4 Claims, 3 Drawing Sheets

(56) References Cited

U.S. PATENT DOCUMENTS

| | | | |
|---|---|---|---|
| 2009/0172028 A1* | 7/2009 | Benitez | G11B 27/10 |
| 2010/0246826 A1* | 9/2010 | Ogura | H04N 5/765 |
| | | | 380/277 |
| 2012/0011555 A1* | 1/2012 | Qian | H04N 21/47211 |
| | | | 725/109 |
| 2012/0314944 A1* | 12/2012 | Ninan | H04N 19/647 |
| | | | 382/166 |
| 2013/0060888 A1* | 3/2013 | Lee | H04N 21/2343 |
| | | | 709/217 |
| 2013/0258192 A1* | 10/2013 | Fukuda | H04N 7/00 |
| | | | 348/474 |
| 2014/0208349 A1* | 7/2014 | Nair | H04N 21/6125 |
| | | | 725/34 |
| 2014/0236333 A1* | 8/2014 | Perkuhn | H04N 21/4331 |
| | | | 700/94 |
| 2015/0378804 A1* | 12/2015 | Betsch | H04L 69/40 |
| | | | 714/37 |
| 2016/0171186 A1* | 6/2016 | Marking | H04L 9/0861 |
| | | | 713/190 |
| 2018/0199081 A1* | 7/2018 | Silverman | H04N 21/23439 |
| 2019/0268624 A1* | 8/2019 | Kim | H04N 21/2143 |

\* cited by examiner

SYSTEM AND METHOD FOR PROVIDING FAILOVER OF STORAGE FOR DIGITAL CINEMA BROADCASTING

FIELD OF THE DISCLOSURE

The present invention relates to the field of a system and method applied in a cinema, and more particularly, to a system for providing a failover of storage for broadcasting in cinema and a method thereof.

BACKGROUND OF THE DISCLOSURE

With the rapid development of the movie industry, more and more demands are applied to broadcasting in a cinema. If the exhibition of a movie fails or stops during its broadcast, both business and reputation of the cinema will be affected. Also, both equipment and technology related to modern cinema facilities must follow certain standards, such as a standard initiated by Digital Cinema Initiatives (DCI). Conventionally, in order to avoid a problem of a storage failure, which can cause problems with a theater broadcasting a movie normally, a cinema facility usually adopts a RAID (Redundant Array of Inexpensive Disks) technology. By providing data via a plurality of separate disks, and depending on the particular RAID configuration, a RAID storage facility can divide data into a plurality of sections, and store different sections in separate disks of the RAID facility. The RAID may use a Parity Check technology to read the data, even when any one of the disks in the array fails, and during data reconstructing, rewrite the data into a new disk after calculation. The DCI standard requires adopting the RAID when one disk is damaged because it won't affect the continued use of other disks. In such a way, a theater avoids the perils of using a single disk storage (e.g. failed or interrupted broadcast) by implementing a plurality of separate disks.

However, recent developments in the quality of digital movies have resulted in higher data requirements, and hence a digital cinema package (DCP) of a movie requires more and more storage space in comparison to the past. Meanwhile, local RAID storage facilities are typically limited, which limits the ability to store a large plurality of DCPs. The limitations of the local storage facilities of cinema establishments typically result in a frequent deletion and updating the DCPs in the disks, as dictated by the movie schedule of a theater. Separately, a local RAID facility has a relatively limited transmission rate of data transfer, especially when one of the disks in the RAID facility is corrupted. Problematic transmissions from a local RAID facility can cause interruptions to the broadcasting of a movie, causing inconvenience to the movie goers and disrupting the movie creator's intent.

There is thus a need for an improved storage solution for DCPs as well as a more robust method of data transfer for purposes of movie broadcasts.

SUMMARY OF THE DISCLOSURE

A purpose of the present invention is to provide an improved storage and delivery solution for broadcasting in a cinema. More specifically, the present invention provides an offsite central storage facility that can communicate with cinemas to provide media content for purposes of broadcasting in the cinema. At the same time, according to a preferred embodiment, copies of the media (in the form of DCPs) are also copied and stored locally at a local storage facility of the cinema. In the event of interruptions of data transfer from the central storage facility, a failover option is provided via the local storage facility to accomplish a seamless handoff without interruption to the cinema experience.

In order to achieve the above mentioned goals, the technical solution of the present invention to solve the technical problems is as follows:

A system for providing a failover of storage for broadcasting in a cinema, wherein said system comprising:

a scheduled playlist module: applied to arranging a scheduled playlist for movie according to a theater;

a central storage module for storing a plurality of DCPs and transmitting a copy of the DCPs of a scheduled movie to a local storage module of the theater accordingly;

a local storage module for receiving the copy of the DCPs sent by the central storage module, and storing the copy of the DCPs;

a server module for receiving data of the DCPs from the central storage module; reading the copy of the DCPs in the local storage module when reading from the central storage module is interrupted; and decoding and decrypting the DCPs or the copy of the DCPs having been read from the central storage module or the local storage module.

The system for providing a failover of storage for broadcasting in a cinema, wherein the server module further comprising:

a detection unit for detecting whether a process of reading data from the central storage module is normal;

a breakpoint control unit for transmitting the DCPs having been read to a broadcast playback unit when reading conditions from the central storage module is operating normally;

when reading the DCPs in the central storage module is detected to be abnormal, recording a frame position of the DCPs received from the central storage module, and switch accordingly to a corresponding frame position of the copy of the DCPs stored in the local storage module, begin reading the copy of the DCPs from the local storage module, and transmitting the copy of the DCPs having been read to a broadcast unit;

a broadcast unit: applied to receiving data of the DCPs having been read from the breakpoint control unit, decoding, decrypting and broadcasting the DCPs.

The system for providing a failover of storage for broadcasting in a cinema, wherein the system is running in a safe mode with a password protection.

A method for providing a failover of storage for broadcasting in a cinema, comprising the steps of:

step A: arranging a scheduled playlist for movie according to each theater;

step B: storing a plurality of DCPs in a central storage module, and copy the DCPs according to the scheduled playlist for movie of each theater, transmitting a copy of the DCPs to a local storage module of the theater for storage accordingly;

step C: receiving the copy of the DCPs in the central storage module and saving the copy of the DCPs;

step D: receiving data of the DCPs in the central storage module, when it is normal reading the central storage module; and reading data accordingly of the copy of the DCPs in the local storage module, when it is abnormal to read the central storage module; decoding, decrypting and broadcasting the DCPs or the copy of the DCPs after having been decoded and decrypted.

The method for providing a failover of storage for broadcasting in a cinema, wherein the step D comprising:

step D1: detecting if it is normal or not reading the central storage module;

step D2: executing a step of D4, when it is detected normal reading the DCPs in the central storage module;

step D3: recording a frame position of the DCPs being read in the central storage module, while switching accordingly to the frame position of the copy of the DCPs in the local storage module and starting reading the copy of the DCPs, executing a step of D4, when it is detected abnormal reading the DCPs in the central storage module;

step D4: receiving data of the DCPs having been read transmitted as in the step of D2 or D3, before decoding, decrypting and broadcasting the DCPs.

The method for providing a failover of storage for broadcasting in a cinema, wherein the method is running in a safe mode with a password protection.

Comparing to the prior art, the present invention provides a system for providing a failover of storage for broadcasting in a cinema and a method thereof. Due to the present invention adopting the central storage module to store the DCPs, and storing the copy of the DCPs to the local storage module, when the server module reading the DCPs in the central storage module is detected to be abnormal, switch to read the copy in the local storage module. In such a way, the cinema is able to store all the DCPs in the central storage module uniformly. Because the storage space and throughput of the central storage module is pretty large, the transmission rate is greatly improved, and when the server module reading the DCPs in the central storage module has problems, it is able to switch instantly to read the local storage module. Thus it provides a multi-layered guarantee for the cinema broadcasting a movie normally, when any one of the storages therein fails, it is still able to guarantee a normal broadcast of the movie.

DETAILED DESCRIPTION

The present invention provides a system for providing a failover of storage for broadcasting in a cinema and a method thereof, in order to make the purpose, technical solution and the advantages of the present invention clearer and more explicit, further detailed descriptions of the present invention are stated here, referencing to the attached drawings and some preferred embodiments of the present invention. It should be understood that the detailed embodiments of the invention described here are used to explain the present invention only, instead of limiting the present invention.

Figure 1:
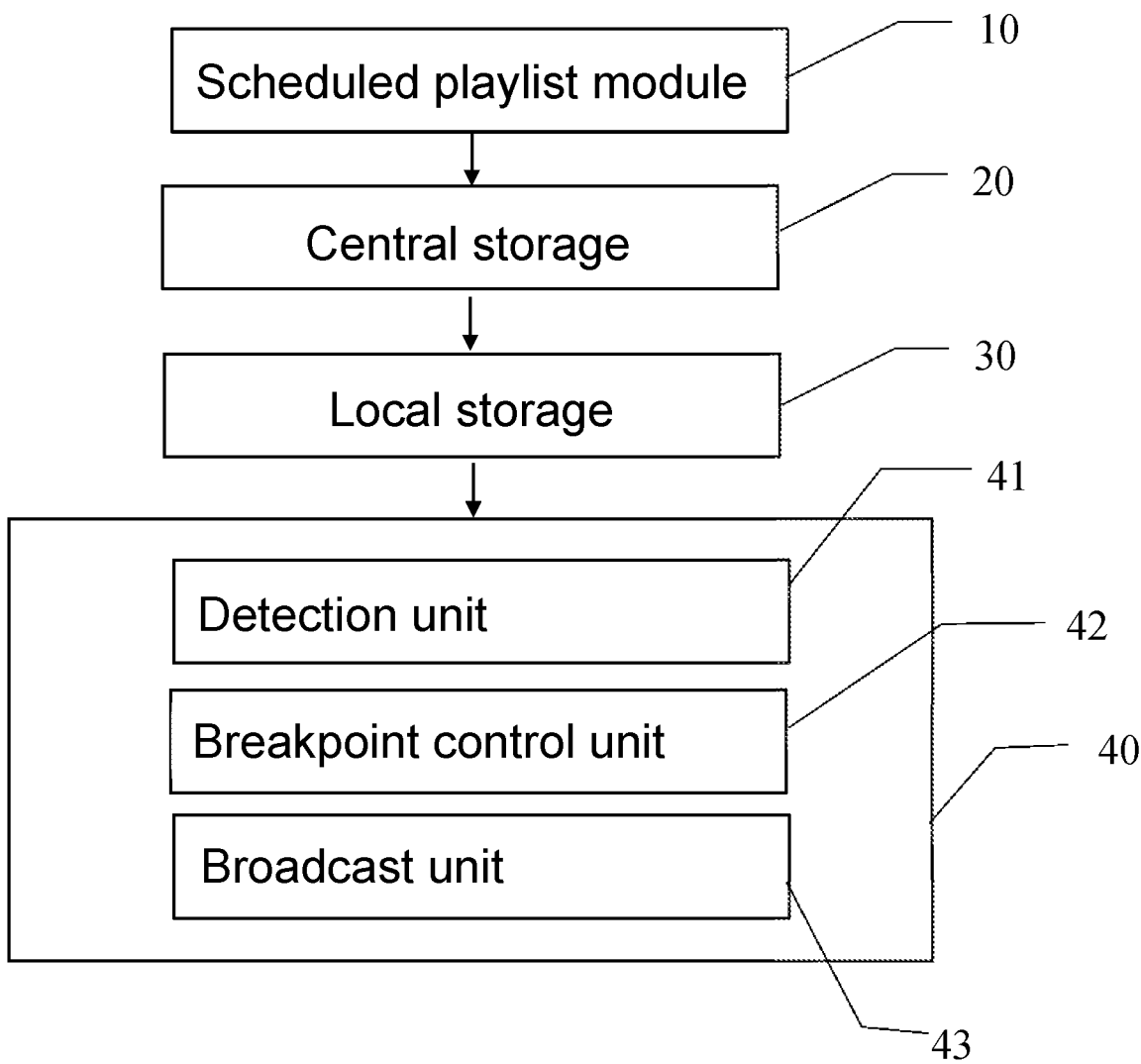
FIG. 1 illustrates a block diagram of a system for providing a failover of storage for broadcasting in a cinema as provided in the present invention.

Referencing to FIG. 1, the system for providing the failover of storage for broadcasting in the cinema comprises a scheduled playlist control module 10, the scheduled playlist module 10 for movies is applied to arranging a scheduled playlist for movies, the scheduled playlist module 10 for movies is arranging a playlist for movies in each theater automatically or manually according to a schedule of movies of the cinema.

The system for providing the failover of storage for broadcasting in the cinema further comprises a central storage 20, the central storage 20 stores a plurality of DCPs to be broadcasted in all theaters, while each theater has a local storage 30, the central storage 20 transmits a copy of the DCPs to the local storage 30 of each theater respectively according to the scheduled playlist for movie of each theater. For example, if there are two theaters, a theater A and a theater B in a cinema, the central storage 20 transmits a copy of the DCPs to the theater A, according to a playlist 1 of the theater A, and a copy of the DCPs to the theater of B, according to a playlist 2 of the theater of B respectively.

A system for providing the failover of storage for broadcasting in the cinema in accordance with another embodiment further comprises a server 40, the server 40 including a detection unit 41, the detection unit 41 detects any interruptions from the reading the of central storage 20. When the reading from the central storage 20 is not interrupted (i.e., under normal circumstances), the server 40 receives the DCPs from the central storage 20 and executes a process of broadcasting. For example, the theater Z is broadcasting a movie A, the server 40 first reads a DCP of the movie A from the central storage 20, the detection unit 41 detects if reading the DCP from central storage 20 is normal, then the server 40 continues reading the DCPs from the central storage 20.

If the reading from the central storage 20 becomes abnormal or interrupted, the server 40 will then switch the reading to read the copy of the DCPs in the local storage 30. For example, when the detection unit 41 detects the central storage 20 is malfunctioning, the server 40 will switch and retrieve a copy of the DCPs pre-stored in the local storage 30.

In another example of the present invention, the server 40 further comprises a breakpoint control unit 42. When an abnormal reading of the DCPs from the central storage 20 is detected, a server records a frame number of the DCPs read from the central storage 20 at (or near) that point in time, and determines a frame position of the interrupted broadcasting, while switching accordingly to a corresponding frame position of the copy of the DCPs in the local storage 30, thus making a seamless switch, while transmitting the copy of the DCPs in the local storage 30 to a broadcast unit 43 to maintain a continuous broadcast. For example, when the theater Z is broadcasting a 100th frame of the movie A, the detection unit 41 detects that the central storage 20 is damaged (it may further comprise any situations causing the central storage 20 not being able to work normally except for damage), then the server 40 records that it has been broadcasted to the 100th frame of the DCP of movie A, and switches simultaneously to the 100th frame in the copy A1 of the DCP according to the movie A in the local storage 30 of the theater Z, and continues reading a follow-up part of the copy A1 of the DCP, thus allowing a seamless switching of the source of the content streaming and enabling an uninterrupted broadcasting of the movie, allowing an audience to watch the movie continuously, without any undesired interruptions including suspensions or screen flashings. Because the present invention, in accordance to one embodiment, points to the DCP, it is easier to determine a position of the movie broadcasting through the frame number, and hence the system is able to make a plurality of real time operation processes including monitoring, recording and switching.

In accordance with another embodiment, a server 40 further comprises a process function of decoding and decrypting after receiving the DCPs in the central storage 20 or the copy of the DCPs in the local storage 30, before broadcasting the DCPs or the copy of the DCPs decoded and decrypted.

In accordance with one example, the system of the present invention described above is executed under a secured mode (i.e., safe mode) with a password protection, which matches the DCI standard. The safe mode means under the DCI standard, to protect a plurality of digital movie rights, each component described above is under a password protection, requiring a responding key delivery message (KDM) to run.

Further description of the operation process of the system for providing the failover of storage for broadcasting in the cinema and the method thereof, as disclosed in the present invention, is stated here, referencing to various preferred embodiments.

In one example, there are a theater A, a theater B and a theater C in a given cinema; three of the theaters are sharing the central storage 20, the central storage 20 storing the DCPs for the entire cinema as a whole, including content identified in a scheduled playlist module 10 which arranges the scheduled playlist for movies manually or acquires the scheduled playlist for movies intelligently according to the theater operations. Acquiring intelligently means acquiring according to a schedule of the cinema through connecting to a schedule system of the cinema. In such an operation, the system obtains a scheduled playlist 1 for movies of the theater A, a scheduled playlist 2 for movies of the theater B, a scheduled playlist 3 for movies of the theater C. The central storage 20 copies the DCPs according to the scheduled playlist 1 for movies, the scheduled playlist 2 for movies, the scheduled playlist 3 for movies, respectively, and transmits the copy of the DCPs accordingly to the local storage 30 according to the theater A, the theater B and the theater C.

In accordance with one embodiment, if in the scheduled playlist for movie of the theater A, in the present week or the present day, it requires broadcasting a movie of X and a movie of Y, and their DCPs accordingly are DCP X and DCP Y, first, it copies automatically the DCP X and the DCP Y stored in the central storage 20 to a copy X1 of the DCP, a copy Y1 of the DCP in the central storage 20, before transmitting the copy of the DCPs to the local storage 30 of the theater A.

When the theater A is broadcasting the movie of X, the server starts to read the DCP X in the central storage 20, followed by transmitting to the broadcasting unit 43, executing decoding and decrypting, before broadcasting the DCP X.

In accordance with one embodiment, if the detection unit 41 detects the central storage 20 is malfunctioning or there are any other reasons causing interruption in the reading of media content from the central storage 20, the breakpoint control unit 42 records a frame position of the DCP X being upon that event. The breakpoint control unit 42 switches accordingly to the recorded frame position of the copy X1 of the DCP in the local storage 30, and starts reading the copy X1 of the DCP, before transmitting the copy X1 of the DCP to the broadcast unit 42, decoding and decrypting, followed by broadcasting continuously, and a seamless broadcasting of the breakpoint is achieved.

Comparing to the prior arts, the present invention adopts the central storage 20, on one hand, due to the central storage 20 having a large capacity, and a large throughput, it is able to adopt a better hardware and software for transmission, thus it is able to improve the transmission rate greatly; on another hand, when a storage whereof is unable to be read, there is still a spare storage of the theater correspondingly for use (i.e. local storage 30), and it ensures a normal broadcast of the movie. And through recording the frame position of the DCPs being read, it is switched seamlessly to read the frame position corresponding to the copy of the DCP in the local storage 30, and there will be no phenomena including screen flashes or pauses appearing during broadcasting the movie, thus it will not affect the viewing experience for the audience.

Figure 2:
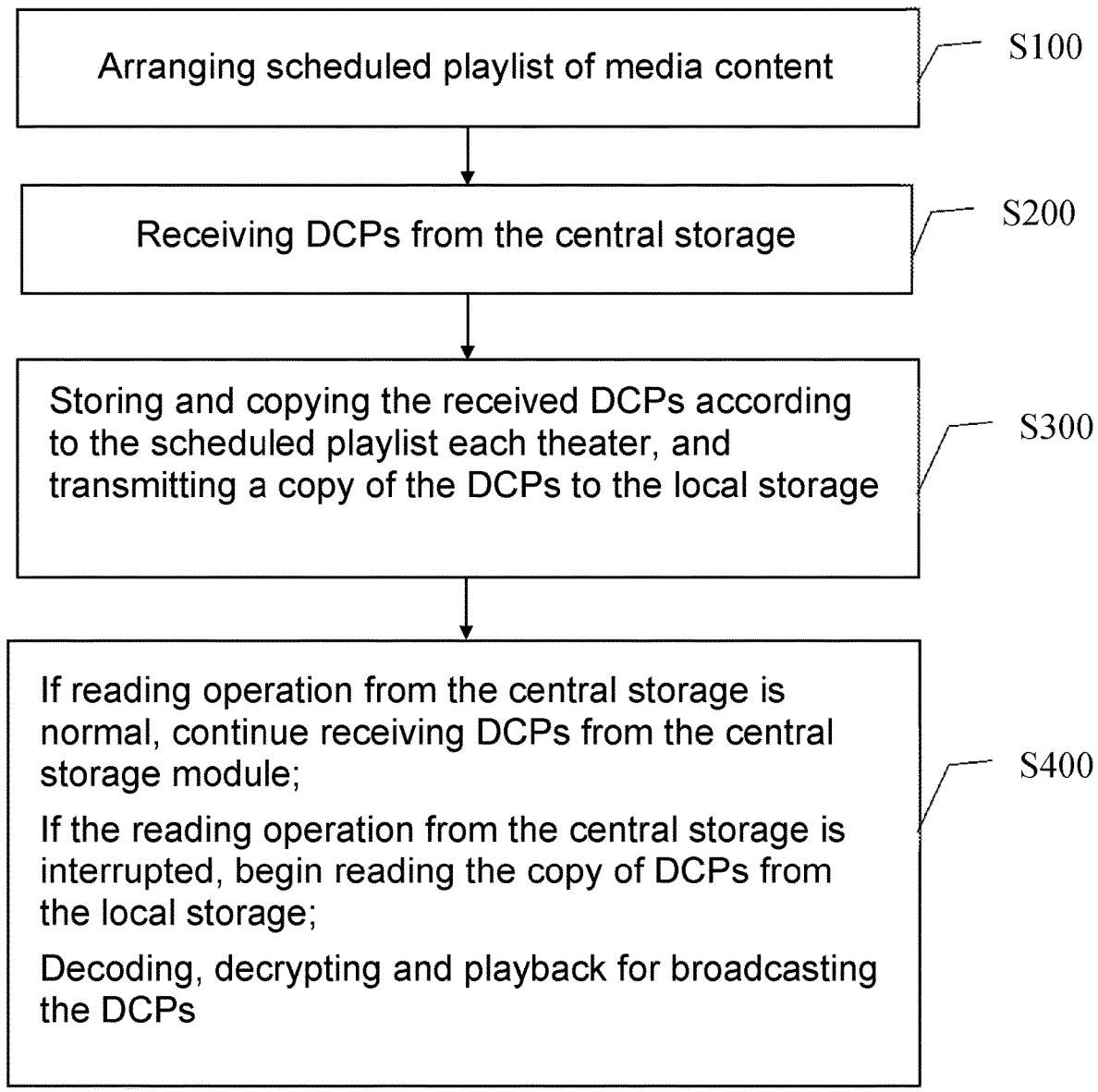
FIG. 2 illustrates a flow chart of a method for providing a failover of storage for broadcasting in a cinema as provided in the present invention.
Figure 3:
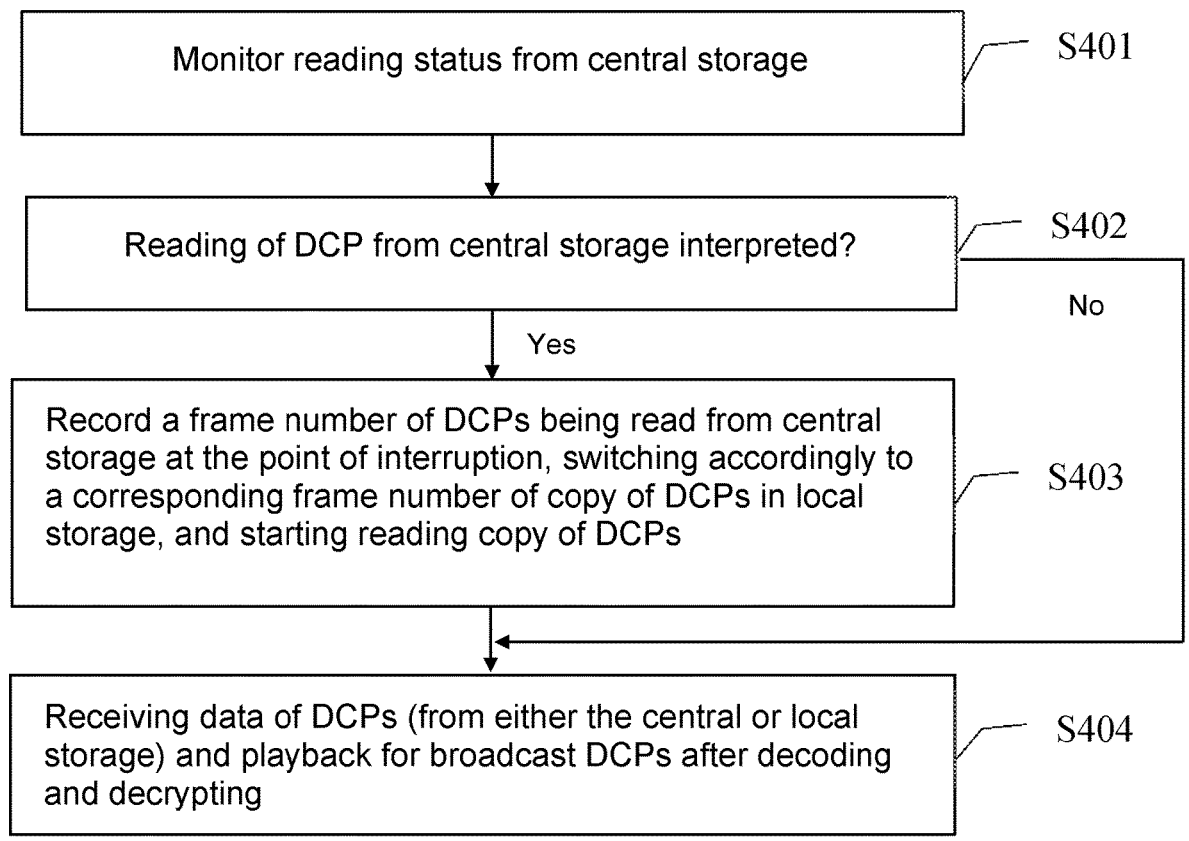
FIG. 3 illustrates a flow chart of a step S400 in the method for providing a failover of storage for broadcasting in a cinema as provided in the present invention.

Shown as FIG. 2, the method for providing a failover of storage for broadcasting in a cinema as provided in the present invention, comprising:

S100: arranging the scheduled playlist for movie according to each broadcasting unit 43 such as the theater in the central storage 20;

S200: storing the DCPs and copying the DCPs according to the scheduled playlist for movies of each theater, as a copy, before transmitting the copy of the DCPs to the local storage 30 of the theater accordingly;

S300: the local storage 30 according to the theater receiving the copy of the DCPs in the central storage 20 and saving the copy of the DCPs;

S400: when the movie is broadcasting, if it is normal reading the central storage 20, receiving data of the DCPs in the central storage 20;

when reading from the central storage 20 is interrupted, such as not being able to obtain a frame picture of the DCPs, then it is switched to the copy of the DCPs in the local storage 30, and switched to a same position before broadcasting continuously; a process of the broadcasting comprises decoding, decrypting and broadcasting a video picture of the DCPs or the copy of the DCPs after decoding and decrypting.

In accordance with another embodiment, the method for providing a failover of storage for broadcasting in a cinema, wherein the step S400 further comprises:

S401: arranging the detection module, detecting if it is normal or not reading and outputting an image frame in the central storage 20;

S402: when it is detected normal reading the DCPs in the central storage module 20, broadcasting normally the DCPs having been read;

S403: when it is detected abnormal reading the DCPs in the central storage 20, recording a frame position of the DCPs being read in the central storage 20, while switching accordingly to the frame position of the copy of the DCPs in the local storage 30, and starting reading the copy of the DCPs, before executing outputting a local data, and broadcasting after seamlessly switching to the copy of the DCPs being read;

S404: receiving the data in the central storage 20 of the S402, or the data in the local storage 30 of the S403, and broadcasting continuously the DCPs accordingly, after decoding and decrypting the DCPs. The method for providing a failover of storage for broadcasting in a cinema is running in a safe mode with a password protection.

It should be understood that, the application of the present invention is not limited to the above examples listed. A person of ordinary skill in the art in this field can improve or change the applications according to the above descriptions, all of these improvements and transforms belong to the scope of protection in the appended claims of the present invention.

What is claimed is:

1. A system for providing a failover of storage for distribution of media content in cinema applications, said system comprising:
  a scheduled playlist unit configured to acquire and store a plurality of scheduled playlists of media content for a plurality of theaters, wherein said plurality of playlists include identifications a plurality of cinematic movies, wherein said scheduled playlist unit intelligently acquires said plurality of playlists through connecting to a scheduling system of each of said plurality of theaters;
  a central storage configured to:
    store a plurality of digital cinema packages, and
    for at least one of said plurality of theaters, transmit a copy of the digital cinema packages according to the scheduled playlist for that theater, wherein said playlist
    includes an identification of a plurality of cinematic movies;
  a local storage configured to receive from the central storage the transmitted digital cinema packages and store the received copy of the digital cinema packages;
  a server configured to receive data of the digital cinema packages directly from the central storage, and from the local storage module in the event reading from the central storage is interrupted;
  a media playback unit configured to read the data received by the server and display the read data, said playback unit including a display device, wherein the media playback unit displays the read data only upon receiving a key delivery message;
  a detection unit configured to detect whether a process of reading the central storage is interrupted; and
  a breakpoint control unit configured to record a frame position of the digital cinema packages received directly from the central storage and identifying the corresponding frame position in the local storage for switching reading of media content by the server from the central storage to the local storage at the frame position, wherein the breakpoint control unit records a frame number of the digital cinema packages read from the central storage near the time of interruption and thereby determines a frame position of the interrupted broadcasting.

2. The system according to claim 1, wherein the system is running in a safe mode with a password protection.

3. A method for providing a failover of storage for distribution of media content in a cinema application to a plurality of theaters, said method comprising the steps of:
  storing a plurality of digital cinema packages in a central storage;
  connecting to a schedule system of each of said plurality of theaters;
  acquiring, from the schedule system of each of said plurality of theaters, a scheduled playlist of cinematic content;
  transmitting from the central storage a copy of the digital cinema packages to a local storage of each of said plurality of theaters in accordance with the acquired scheduled playlists;
  receiving at the local storage the transmitted digital cinema packages from the central storage;
  transmitting from the central storage digital cinema packages for real-time playback;
  receiving key delivery message at the local storage;
  in response to receiving key delivery message, causing the playback of the digital cinema package;
  detecting interruption to the reading from the digital cinema package from the central storage during real-time playback;
  upon detection of interruption, recording a frame number of the digital cinema packages being read from the central storage module for real-time playback, wherein the frame number of the digital cinema packages read from the central storage near the time of interruption and determines a frame position of the interrupted broadcasting; and
  switching reading to the local storage at a corresponding frame position of the copy of the digital cinema packages when interruption to the reading of data from the central storage for real-time playback is detected;
  wherein said reading of digital cinema packages from the local storage includes decrypting the content of the digital cinema packages.

4. The method according to claim 3, wherein the method is running in a safe mode with a password protection.

* * * * *